United States Patent Office 3,539,345
Patented Nov. 10, 1970

3,539,345
THERMAL DIAZOTYPE PAPERS
Walter J. Welch, Binghamton, N.Y., assignor to GAF Corporation, New York, N.Y., a corporation of Delaware
No Drawing. Filed Feb. 1, 1967, Ser. No. 613,081
Int. Cl. G03c 1/54
U.S. Cl. 96—91                                       5 Claims

ABSTRACT OF THE DISCLOSURE

Two-component thermal diazo sensitizing compositions comprising an azo coupler and a light-sensitive diazonium compound and wherein the latter is employed in the form of the fluoborate, trifluoroacetate or sulfate stabilized salt.

---

The present invention relates in general to the production of light-sensitive, heat-developable diazotype photoprinting materials and in particular to high-speed, two-component sensitizing compositions of improved thermal stability useful in preparing same.

As is well known, two-component diazotype photoprinting material will usually comprise a supporting sheet, such as paper or film, having a light-sensitive layer thereon containing, inter alia, an azo coupling component and a light-sensitive diazonium compond stabilized against premature coupling by inclusion of an acid stabilizer. Upon exposure of such coating to actinic radiation, the light-sensitive diazonium compound undergoes a photolytic decomposition in the light-struck areas, the decomposition products being incapable of reaction with the azo coupling components when subjected to the alkaline conditions employed in the development operation. Development of the exposed material will usually be effected with the use of gaseous ammonia, whereupon the acid stabilizer is neutralized with the concomitant shift in the pH of the diazo layer initiating the azo dye-forming coupling reaction between residual diazonium compound and coupler whereupon an azo dye image forms in the nonlight-struck areas. Despite the extensive commercial adoption of the foregoing photoprinting technique, certain disadvantages nevertheless attend its practice. For example, alkaline development operations based upon the use of ammonia require the use of special equipment in order to eliminate the problems associated with noxious ammonia vapors. The additional expense involved can, of course, be economically burdensome.

As a consequence, considerable industrial activity has centered around the research and development of photocopying techniques based on the use of light-sensitive diazonium compounds which would obviate any necessity for the use of extraneous chemicals to supply the alkaline environment necessary to dye-forming development.

Paramount among the techniques heretofore evolved in pursuance of the foregoing objectives are those which involve the use of two-component diazo sensitizing compositions in which the dye-forming coupling reaction is capable of initiation by the action of heat alone, i.e., the so-called "thermal" diazo-type compositions. The latter, characteristically, contain one or more reagents having an acid to neutral reaction and which, on heating, dissociate to yield an alkaline-reacting compound. Thus, when thermal dissociation of such a substance proceeds to an extent sufficient to impart an overall alkaline pH to the diazo layer, the coupling reaction is initiated in the nonlight-struck portions, i.e., those areas corresponding to the opaque areas of the negative or positive being reproduced.

Heretofore, however, considerable difficulties have been encountered in connection with attempts to provide thermal diazo-type papers possessed of the desired thermal stability. In general, the problems involved are traceable to the fact that the diazo sensitizing component, conventionally provided in the form of a stabilized salt, exhibits a pronounced tendency to decompose at temperatures well below those usually employed in the heat-development operation. This, of course, tends to vitiate substantially any attempt to obtain a photocopy having satisfactory photographic qualities, i.e., density, contrast, image saturation, brightness, and the like.

In an attempt to overcome or otherwise alleviate the problems relating to thermal instability of heat-developable, two-component diazotype compositions thus far promulgated, the art has resorted to a wide variety of remedial techniques. For example, it has been suggested by numerous prior art investigators that the diazonium salt and coupler, respectively, be provided in separate layers on coatings in order to minimize any possibility of premature coupling. In general, such techniques are implemented by applying to opposite sides of a porous base, a light-sensitive diazonium layer and an alkaline-generating layer, respectively. Thermal development is then effected by subjecting the exposed element to elevated temperatures sufficient to cause thermal decomposition of the alkaline-generating compound with the concurrent generation of alkaline vapors. The latter diffuses or otherwise migrates to the light-sensitive diazonium layer with development occurring in the manner explained hereinbefore. When utilizing such a procedure it is not necessary that the generation of alkaline material occur as a result of thermal decomposition since the alkaline material may initially be provided in a form capable of effecting development, the function of the heat being limited solely to promoting diffusion. Other variants of the foregoing procedures which rely for operability on the physical isolation of coupler and diazo have likewise been suggested.

However, in the vast majority of instances, such techniques have been found to involve relatively serious practical difficulties which have correspondingly tended to retard any significant degree of commercial exploitation. One of the principal objections relates to the lack of speed of such systems, explainable by reference to the fact that the coupling reaction rate, being inherently dependent upon the rate of diffusion of the alkaline material into the diazo layer, is intolerably low.

In addition, the density and brightness of the image obtained will invariably be unsatisfactory. Since the effective speed of the reproduction system is a direct function of the rate at which the diazonium compound undergoes photolytically induced decomposition, there has developed in the art a distinct preference for diazo sensitizers of the high-speed type, i.e., those having a high order of actinic response and thus photodecomposition rate.

Despite their several advantages, the high-speed diazo sensitizers thus far evolved have in the main provided but marginal advantage; perhaps the primary objection to the use of such compounds resides in their pronounced lack of stability under even moderate conditions of storage, i.e., temperature, humidity, etc. The importance of the instability factor cannot be emphasized too vigorously since the spurious effects attributable thereto are usually manifested in the form of background discoloration and thus loss of contrast, density, etc., in the final print material. In addition, diazotype materials containing such high-speed sensitizers are eminently unsuitable for use in the preparation of intermediate prints where subsequent exposures therewith would be required. Again, the inferior sensitometric properties of such materials would become even more evident in the print copy.

The foregoing problems have been found to be particularly manifest in connection with the use of two-component heat-developable diazo sensitizing compositions wherein the light-sensitive compound comprises a diazo derivative of a paraphenylenediamine of the following structural formula:

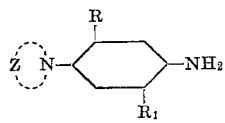

I wherein Z represents the non-metallic atoms necessary to complete a heterocyclic nucleus selected from the group consisting of morpholine, thiomorpholine, piperidine and piperazine, and R and $R_1$ independently represent hydrogen, lower alkoxy containing from 1 to 4 carbon atoms, e.g., ethoxy, butoxy, etc.; lower alkyl, e.g., methyl, ethyl, propyl, etc.; lower hydroxyalkyl, e.g., 2-hydroxyethyl; lower hydroxyalkoxy, e.g., 2-hydroxypropoxy, 3-hydroxypropoxy, 4-hydroxybutoxy, etc.; alkoxyalkoxy such as 2-ethoxyethoxy, 2-ethoxypropoxy, 3-ethoxypropoxy, etc.

Diazo derivaties of compounds encompassed by the above formula have heretofore constituted a particularly preferred class of compounds for use in thermal diazotype formulae since they possess an exceptionally high order of coupling activity. Conventionally, such diazo derivatives are employed in the form of their stabilized double salts with zinc chloride, tin chloride, cadmium chloride and the like. Despite the adaptability of such diazo compounds to the thermal diazotype process, certain drawbacks have been found to attend their use, the genesis of the problem relating to the low thermal decomposition points characterizing their stabilized salts. As a direct result, significant amounts of diazo are rendered unavailable for image formation due to preliminary thermal decomposition.

Thus, in accordance with the discovery forming the basis of the present invention, it has been found that the thermal stability of heat-developable light-sensitive diazo compositions can be synergistically modified to advantage by employing the diazo derivative in the form of specific stabilized salt derivatives.

Therefore, a primary object of the present invention resides in the provision of heat-developable diazo sensitizing compositions wherein the above and related disadvantages are eliminated or at least mitigated to a substantial extent.

Another object of the present invention resides in the provision of heat-developable diazo sensitizing compositions of exceptionally high speed and which yield prints characterized by improved density, contrast, saturation, absence of background discoloration, and the like.

A further object of the present invention resides in the provision of heat-developable diazo sensitizing compositions having excellent thermal stability being advantageously adapted for high-speed thermal diazotype reproduction methods.

Other objects of the present invention will become apparent hereinafter as the description proceeds.

The attainment of the foregoing and related objects is made possible in accordance with the present invention which in its broader aspects includes the provision of two-component thermal diazotype papers wherein the diazo sensitizer compound is present in the form of a stabilized fluoroborate, trifluoroacetate or sulfate.

The fluoroborate, trifluoroacetate and sulfate stabilized diazo salts contemplated for use in accordance with the present invention not only provide thermal diazotype systems of markedly improved stability, but, in addition, yield prints possessed of superior dye density, contrast, detail, etc., and particularly when subjected to high-speed reproduction processing.

One of the truly surprising features of the present invention resides in the discovery that the aforedescribed improvements are in no way limited to diazo compounds of the type encompassed by the above-depicted formula but extend to any of the diazo sensitizers conventionally employed in thermal diazotype systems. It should nevertheless be pointed out, however, that the improvements described herein are particularly beneficial with those diazo derivatives found to provide optimum advantage in high-speed processing, typical representatives of this type of diazo being illustrated in the above formula. In any event, diazo sensitizing compounds suitable for use in thermal diazotype processes are well known in the art and can be represented for convenience according to the following structural formula:

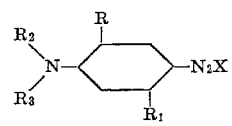

II wherein R and $R_1$ have the significance defined in Formula I above; $R_2$ and $R_3$ represent alkyl, aralkyl, hydroxyalkyl, or together represent the atoms necessary to complete a heterocyclic nucleus selected from the group consisting of morpholine, thiomorpholine, piperidine and piperazine; and wherein X represents an acid anion selected from the group consisting of fluoroborate, trifluoroacetate, and sulfate. It is generally preferred that the alkyl moieties comprise lower alkyl of from 1 to 4 carbon atoms. As particular examples of compounds coming within the ambit of the above-defined formula and found to be eminently suitable for use in the practice of the present invention, there may be mentioned, without necessary limitation, the following:

4-dimethylaminobenzenediazonium trifluoroacetate
2,5-diethoxy-4-morpholinobenzenediazonium fluoroborate
2,5-diethoxy-4-morpholinobenzenediazonium sulfate
2,5-dibutoxy-4-dimethylaminobenzenediazonium trifluoroacetate
2,5-dihydroxyethoxy-4-morpholinobenzenediazonium sulfate
2-(2-hydroxyethoxy)-5-(2-ethoxyethoxy)-4-piperidinobenzenediazonium trifluoroacetate
2,5-dibutoxy-4-piperazinobenzenediazonium fluoroborate.

It is recognized, of course, that diazo sensitizing compounds have previously been employed in thermal diazo sensitizing relationships in the form of stabilized solids, e.g., zinc chloride, stannic chloride and cadmium chloride, etc. However, and practically without exception, stabilized salts of these types have failed to provide the necessary degree of stability, especially under the conditions imperative for use in high-speed thermal processing. Moreover, even in those instances wherein rather limited classes of stabilized diazo salts are found to provide the requisite speed, it is invariably found that the resulting dye density obtained in the final copy lacks the desired opacity and saturation of color, thereby necessitating resort to the use of ancillary ingredients for purposes of augmenting the dye reproduction characteristics. In other cases it is found that feasible high-speed systems could be realized if the stabilized diazo salt be employed in conjunction with rather specific types of coupling components. In contradistinction, the fluoroborate, trifluoroacetate and sulfate-stabilized benzenediazonium compounds of the present invention in no way depend for operability upon the nature of the coupling components employed.

Thus, diazo coupling components which may be effectively employed in the compositions of the present invention may be selected from a wide variety of materials with particular examples including, without necessary limitation, the following:

2-(m-hydroxyphenoxy)ethanol
sodium 6,7-dihydroxynaphthalene-2-sulfonate
2,3-dihydroxynaphthalene
1,8-dihydroxynaphthalene
phloroglucinol
resorcinol
octylresorcinol
α-methyl-1-phenyl-5-pyrazolone
acetoacetanilide
H-acid
sodium 6,7-dihydroxynaphthalene-2-sulfonate
2,5-xylenol
2-methyl resorcinol, etc.

as well as mixtures comprising two or more of such compounds.

Heat-responsive reagents having an acid to neutral reaction at room temperature and which are adapted to yield, on heating to temperatures of 100° C. to 200° C., an alkaline reacting compound for neutralizing the acid ingredient of the light-sensitive diazo compositions of the present invention include sodium trichloroacetate as well as its derivatives which are capable of yielding ammonium or nitrogen bases on heating, alkali metal salts of strong organic acid which are decomposed on heating to form basic compounds such as alkali metal salts of malonic, oxalic, maleic or benzene sulphinic acids; alkali metal salts of aliphatic monocarboxylic acids having 2, 3 or more carbon atoms containing negative substituents such as halogen, $CN$ or $NO_2$ in the alpha and/or beta positions; and of these, especially the alkali metal (e.g., Na, K), ammonium and nitrogen base salts of trichloroacetic acid.

Accelerators or auxiliary sources of alkali such as dicyandiamide, guanidine sulfate and the like can be used advantageously with any of the aforesaid reagents having an acid to neutral reaction.

In addition, acid stabilizers such as citric acid, tartaric acid, boric acid, acetic acid and similar acid reacting compounds can be used to prevent premature coupling of the diazonium salt and azo coupling component.

In addition to the foregoing materials there may also be included reagents commonly employed in diazotype photoprinting materials as for example, intensifiers such as ammonium sulfate, zinc chloride, magnesium chloride, nickel sulfate, etc.; stabilizing agents such as thiourea, or thiosinamine; accelerators such as 1-allyl-3-β-hydroxyethyl-thiourea or 1-allyl-thiourea; hygroscopic agents such as glycol or glycerin; wetting agents such as saponin, lauryl sulfate, keryl benzene sulfonate or oleyl-N-methyltaurine; binders such as polyvinyl alcohol, starch, polyvinyl acetate, etc., pigments such as silica, alumina, etc.

The components of the sensitizing composition are preferably incorporated in a single solution or suspension and applied in a single coating step to the base. The latter may be paper, or film such as regenerated cellulose, cellulose acetate or other plastic films. However, the various components of the sensitizing composition may be applied, if desired, in successive coatings—one containing, for example, the diazonium salt, and another the alkali generating heat-sensitive reagent, the azo coupling component being incorporated as preferred in either of the two layers.

The material coated in accordance with the invention is developed after exposure under an opaque pattern on a translucent background, by heating at temperatures ranging from about 100° C. to about 200° C. and preferably from about 110° C. to about 165° C. at which decomposition or conversion of the acid to neutral reagent occurs. This promotes coupling of the residual diazonium compound with the azo coupling component.

The following examples are given for purposes of illustration only and should not be considered in any way as limiting the scope of the present invention. In the examples, all parts given are by weight unless otherwise indicated.

EXAMPLE I

A paper base is coated with the following sensitizing composition:

| Composition: | Parts |
|---|---|
| Water | 100 |
| Guanidine sulfate | 4 |
| Polyvinyl alcohol | 4 |
| Citric acid | 0.5 |
| Acetamide | 2 |
| Magnesium chloride | 1 |
| Sodium 1,3,6-naphthalene trisulfonate | 3 |
| Sodium 6,7-dihydroxynaphthalene-2-sulfonate | 3 |
| Sucrose | 2 |
| 4-dimethylaminobenzenediazonium trifluoroacetate | 0.5 |
| Saponin | 0.1 |
| Secondary butyl alcohol | 1 |
| Polyvinyl acetate emulsion | 3 |
| Silica | 5 |
| Sodium trichloroacetate | 2 |

After coating, the paper is dried, exposed to light under a translucent original bearing opaque image areas. The exposed paper is then developed by passing it through a heated chamber maintained at temperatures ranging from 110° C. to 165° C., whereupon development occurs yielding a posiitve image having blue image areas of excellent density and brightness. A control sample prepared and processed in identical manner except for the use of the diazonium compound in the form of the chlorozincate salt yields a final print having a dye density in the image areas on the order of 25 percent less than that obtained with the trifluoroacetate derivative. The dye density measurements in each case were taken on an Ansco Macbeth Reflectance Densitometer.

Further, the sample containing the 4-dimethylaminobenzenediazonium trifluoroacetate derivative exhibited much less background discoloration when compared with the control sample. The 4-dimethylaminobenzenediazonium trifluoroacetate of the foregoing example is prepared in the following manner:

Diazotization is effected by treating approximately 0.05 mole of 4-dimethylaminoaniline hydrochloride with a solution comprising 2 N hydrochloric acid and 5 M sodium nitrite. To the diazonium chloride solution which forms there is added 0.1 mole of trifluoroacetic acid in water. The solid precipitate which forms is filtered, washed with ether and partially dried. The product, 4 - dimethylaminobenzenediazonium trifluoroacetate, is collected and dried in vacuo.

EXAMPLE II

A paper base is coated with the following diazo sensitizing compositions: (All parts are by weight.)

| Composition: | Parts |
|---|---|
| Water | 100 |
| Guanidine sulfate | 4 |
| Polyvinylalcohol | 4 |
| Citric acid | 0.5 |
| Acetamide | 2 |
| Magnesium chloride | 1 |
| Sodium 1,3,6-naphthalene trisulfonate | 3 |
| Sodium 6,7-dihydroxy naphthalene-2-sulfonate | 3 |
| Sucrose | 3 |
| 2,5-diethoxy-4-morpholinobenzenediazonium fluoroborate | 0.5 |
| Saponin | 0.1 |
| Sec. butanol | 1 |
| Polyvinyl acetate emulsion | 3 |
| Silica | 5 |
| Sodium trichloroacetate | 2 |

After coating, the paper is dried and exposed to light under a translucent original bearing opaque image areas. The exposed paper is then developed by passing it through a heated chamber maintained at temperatures ranging from 110° C. to 165° C. whereupon there is obtained a positive image having blue image areas of excellent density and brightness. Control samples prepared and processed in identical manner except for the use of the diazonium compound in the form of the chlorozincate salt yielded a final print having a dye density in the image areas on the order of 25 percent less than that obtained with the fluoroborate derivative. Dye density measurements in each case were taken on an Ansco Macbeth Reflectance Densitometer.

The 2,5-diethoxy-4-morpholinoaniline-hydrochloride is well known in the diazotype art being extensively described in the published literature both patent and otherwise. The stabilized salt can be prepared by merely precipitating an aqueous solution of the 2,5-diethoxy-4-morpholinoaniline-hydrochloride with fluoroboric acid.

EXAMPLE III

A paper base is coated with the following sensitizing composition: (All parts are by weight.)

| Composition: | Parts |
| --- | --- |
| Water | 100 |
| Guanidine sulfate | 4 |
| Polyvinylalcohol | 4 |
| Citric acid | 0.5 |
| Acetamide | 2 |
| Magnesium chloride | 1 |
| Sodium 1,3,6-naphthalene trisulfonate | 3 |
| Sodium 6,7-dihydroxynaphthalene-2-sulfonate | 3 |
| Sucrose | 3 |
| 2,5-diethoxy-4-morpholinobenzenediazonium sulfate | 0.5 |
| Saponin | 0.1 |
| Secondary butyl alcohol | 1 |
| Polyvinylacetate emulsion | 3 |
| Silica | 5 |
| Sodium trichloroacetate | 2 |

After coating, the paper is dried and exposed to light under a translucent original bearing opaque image areas. The exposed paper is thereafter developed by passing it through a heated chamber maintained at temperatures ranging from 110° C. to 165° C. whereupon there is obtained a positive image having blue image areas of excellent density and brightness. Control samples prepared and processed in identical manner except for the use of the diazonium compound in the form of the chlorozincate salt yield a final print having a dye density in the image areas on the order of 25 percent less than that obtained with the sulfate derivative. Again, dye density measurements in each case were taken on an Ansco Macbeth Reflectance Densitometer. The 2,5-diethoxy-4-morpholinobenzenediazonium sulfate utilized in the above example was prepared in a manner similar to that described in Example 2 except, of course, that sulfuric acid is employed in lieu of fluoroboric acid.

Results similar to those described above are obtained when the particular procedures exemplified are repeated but wherein the diazo derivative is substituted in equivalent amounts with each of the following compounds:

2,5-dibutoxy-4-dimethylaminobenzenediazonium trifluoroacetate
2,5-dihydroxyethoxy-4-morpholinobenzenediazonium sulfate
2-(2-hydroxyethoxy)-5-(2-ethoxyethoxy)-4-piperidinobenzenediazonium trifluoroacetate
2,5-dibutoxy-4-piperazinobenzenediazonium fluoroborate.

The present invention has been disclosed with respect to certain preferred embodiments thereof and there will become obvious to persons skilled in the art various modifications, equivalents or variations thereof which are intended to be included within the spirit and scope of this invention.

What is claimed is:

1. A two-component, heat-developable diazo sensitizing composition comprising as essential ingredients an azo coupling component, an acid stabilizing compound, a neutral to acid salt of a strong organic acid capable of yielding an alkaline reacting compound on heating to temperatures ranging from about 100° C. to about 200° C. and a light-sensitive 4-aminobenzene diazonium compound in the form of the salt of trifluoroacetate.

2. A composition according to claim 1 wherein said light-sensitive diazonium compound comprises 4-dimethylaminobenzenediazonium trifluoroacetate.

3. A composition according to claim 1 wherein said neutral to acid salt of a strong, organic acid comprises trichloroacetic acid.

4. A two-component, heat-developable diazotype photoprinting material comprising a support sheet and a light-sensitive layer thereon comprising the composition of claim 1.

5. A diazotype photoprinting material according to claim 4 wherein said support sheet comprises paper.

References Cited

UNITED STATES PATENTS

| | | | |
| --- | --- | --- | --- |
| 2,618,555 | 11/1952 | Reichel | 96—91 |
| 2,653,091 | 9/1953 | Greig | 96—91 XR |
| 2,744,103 | 5/1956 | Koch | |
| 2,774,669 | 12/1956 | Marron et al. | 96—49 |
| 2,789,904 | 4/1957 | Benbrook et al. | 96—49 |
| 2,980,534 | 4/1961 | Printy et al. | 96—49 XR |
| 3,154,417 | 10/1964 | Aebi et al. | 96—49 XR |
| 3,202,510 | 8/1965 | Hollmann | 96—49 XR |
| 3,203,803 | 8/1965 | Habib et al. | 96—91 |
| 3,281,244 | 10/1966 | Endermann et al. | 96—49 XR |
| 3,316,092 | 4/1967 | Klimkowski et al. | 96—49 XR |
| 3,326,686 | 6/1967 | Randall et al. | 96—49 XR |
| 3,353,894 | 11/1967 | Landau | 96—91 XR |
| 3,416,924 | 12/1968 | Tummeus | 96—49 XR |

FOREIGN PATENTS

| | | |
| --- | --- | --- |
| 571,802 | 9/1945 | Great Britain. |

OTHER REFERENCES

Chem. Abstracts (I), vol. 49, 5404a, 1955.
Chem. Abstracts (I), vol. 60, 14368b, 1964.
Saunders, K. H., "The Aromatic Diazo Compounds," 1949, pp. 41, 42 and 72–81 relied on.

J. TRAVIS BROWN, Primary Examiner

C. BOWERS, Assistant Examiner

U.S. Cl. X.R.

96—49; 260—142